(12) United States Patent
Coates

(10) Patent No.: US 8,143,906 B2
(45) Date of Patent: *Mar. 27, 2012

(54) TEMPERATURE AND PRESSURE TRANSDUCER

(75) Inventor: Don M. Coates, Santa Fe, NM (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/953,842

(22) Filed: Nov. 24, 2010

(65) Prior Publication Data

US 2011/0068794 A1    Mar. 24, 2011

Related U.S. Application Data

(63) Continuation of application No. 12/026,795, filed on Feb. 6, 2008, now Pat. No. 7,863,907.

(60) Provisional application No. 60/899,629, filed on Feb. 6, 2007.

(51) Int. Cl.
    *G01R 27/26*  (2006.01)

(52) U.S. Cl. ........ 324/661; 324/338; 324/655; 324/690; 73/724; 73/733; 73/152.52; 361/283.1

(58) Field of Classification Search .................... 324/661
See application file for complete search history.

(56) References Cited

U.S. PATENT DOCUMENTS

| | | | |
|---|---|---|---|
| 3,320,579 A | 5/1967 | Abbott | |
| 3,562,741 A | 2/1971 | McEvoy et al. | |
| 4,023,136 A | 5/1977 | Lamensdorf et al. | 340/18 NC |
| 4,160,970 A | 7/1979 | Nicolson | 340/18 LD |
| 4,218,507 A | 8/1980 | Deffeyes et al. | 428/328 |
| 4,308,499 A | 12/1981 | Thierbach et al. | 324/337 |
| 4,430,577 A | 2/1984 | Bouquet | 307/108 |
| 4,839,644 A | 6/1989 | Safinya et al. | 340/854 |
| 4,845,378 A | 7/1989 | Garbe et al. | 307/106 |
| 4,924,701 A * | 5/1990 | Delatorre | 73/152.52 |
| 5,055,787 A * | 10/1991 | Kleinberg et al. | 324/303 |
| 5,150,067 A | 9/1992 | McMillan | 328/64 |
| 5,168,419 A * | 12/1992 | Delatorre | 361/283.2 |
| 5,189,591 A * | 2/1993 | Bernot | 361/283.4 |

(Continued)

FOREIGN PATENT DOCUMENTS

DE         10245425         4/2003

(Continued)

OTHER PUBLICATIONS

Goswami et al., On Subsurface Wireless Data Acquisition System, IEEE Transactions on Geoscience and Remote Sensing, vol. 43, No. 10, Oct. 2005.

(Continued)

*Primary Examiner* — Timothy J Dole
*Assistant Examiner* — Benjamin M Baldridge
(74) *Attorney, Agent, or Firm* — Pillsbury Winthrop Shaw Pittman LLP

(57) ABSTRACT

Methods for making and systems employing pressure and temperature sensors are described. Embodiments include a capacitive element including a first conductor plate and a second conductor plate. Each plate includes a conductor layer formed on a substrate. In a pressure sensor embodiment, seal is positioned at or near the edges of the conductor plates, and a gas retained in a gap defined between the plates. In a temperature sensor embodiment, the gap defined between the plates is in fluid communication with the external environment.

10 Claims, 10 Drawing Sheets

U.S. PATENT DOCUMENTS

| | | | | |
|---|---|---|---|---|
| 5,207,767 | A * | 5/1993 | Delatorre | 73/733 |
| 5,230,250 | A * | 7/1993 | Delatorre | 73/733 |
| 5,303,589 | A * | 4/1994 | Reidemeister et al. | 73/497 |
| 5,355,714 | A | 10/1994 | Suzuki et al. | 73/146.5 |
| 5,423,222 | A | 6/1995 | Rudd et al. | 73/779 |
| 5,451,873 | A | 9/1995 | Freedman et al. | 324/303 |
| 5,467,083 | A | 11/1995 | McDonald et al. | 340/854.6 |
| 5,576,703 | A | 11/1996 | MacLeod et al. | 340/854.4 |
| 5,587,707 | A | 12/1996 | Dickie et al. | 340/870.09 |
| 5,680,029 | A | 10/1997 | Smits et al. | 320/2 |
| 5,686,779 | A | 11/1997 | Vig | 310/366 |
| 5,751,895 | A | 5/1998 | Bridges | |
| H1744 | H | 8/1998 | Clayton et al. | 374/117 |
| 5,821,129 | A | 10/1998 | Grimes et al. | 436/151 |
| 5,917,160 | A | 6/1999 | Bailey | |
| 5,936,913 | A | 8/1999 | Gill et al. | 367/25 |
| 5,942,991 | A | 8/1999 | Gaudreau et al. | 340/870.16 |
| 6,025,725 | A | 2/2000 | Gershenfeld et al. | 324/652 |
| 6,234,257 | B1 | 5/2001 | Ciglenec et al. | 175/50 |
| 6,275,048 | B1 * | 8/2001 | Milli | 324/690 |
| 6,278,379 | B1 * | 8/2001 | Allen et al. | 340/870.16 |
| 6,393,921 | B1 | 5/2002 | Grimes et al. | 73/728 |
| 6,434,372 | B1 | 8/2002 | Neagley et al. | 455/106 |
| 6,489,772 | B1 | 12/2002 | Holladay et al. | |
| 6,633,236 | B2 | 10/2003 | Vinegar et al. | 340/854.4 |
| 6,670,880 | B1 | 12/2003 | Hall et al. | 336/132 |
| 6,766,141 | B1 * | 7/2004 | Briles et al. | 455/40 |
| 6,993,432 | B2 | 1/2006 | Jenkins et al. | 702/13 |
| 7,017,662 | B2 | 3/2006 | Schultz et al. | 166/254.2 |
| 7,114,561 | B2 | 10/2006 | Vinegar et al. | 166/250.01 |
| 7,158,049 | B2 | 1/2007 | Hoefel et al. | 340/855.7 |
| 7,168,487 | B2 | 1/2007 | Salamitou et al. | 166/250.11 |
| 7,180,826 | B2 | 2/2007 | Kusko et al. | 367/85 |
| 7,256,707 | B2 | 8/2007 | Clark et al. | 340/854.4 |
| 7,397,388 | B2 | 7/2008 | Huang et al. | 340/853.3 |
| 7,548,068 | B2 | 6/2009 | Rawle et al. | 324/534 |
| 2002/0195247 | A1 | 12/2002 | Ciglenec et al. | |
| 2003/0010492 | A1 | 1/2003 | Hill et al. | |
| 2005/0110655 | A1 | 5/2005 | Layton | |
| 2006/0185899 | A1 * | 8/2006 | Alft et al. | 175/24 |
| 2006/0266109 | A1 | 11/2006 | DiFoggio | |
| 2007/0030762 | A1 | 2/2007 | Huang et al. | 367/83 |
| 2007/0095148 | A1 * | 5/2007 | Takahashi | 73/754 |
| 2007/0107528 | A1 | 5/2007 | Schroeder et al. | 73/779 |
| 2007/0206440 | A1 | 9/2007 | Fripp et al. | 367/81 |
| 2007/0235184 | A1 * | 10/2007 | Thompson et al. | 166/250.01 |
| 2008/0030189 | A1 * | 2/2008 | McCarty | 324/242 |
| 2008/0061789 | A1 | 3/2008 | Coates et al. | 324/333 |
| 2008/0184787 | A1 | 8/2008 | Coates et al. | 73/152.12 |
| 2008/0185328 | A1 | 8/2008 | Stefanini | 210/222 |
| 2008/0187025 | A1 | 8/2008 | Coates et al. | 374/184 |
| 2008/0253230 | A1 | 10/2008 | Thompson et al. | 367/129 |
| 2008/0264624 | A1 | 10/2008 | Hall et al. | 166/66.5 |
| 2009/0159361 | A1 | 6/2009 | Coates et al. | 181/106 |
| 2009/0174409 | A1 | 7/2009 | Coates et al. | 324/338 |

FOREIGN PATENT DOCUMENTS

| | | |
|---|---|---|
| EP | 0314654 | 5/1989 |
| EP | 1434063 | 6/2004 |
| GB | 2386691 | 9/2003 |
| GB | 2425593 | 11/2006 |

OTHER PUBLICATIONS

International Search Report and Written Opinion for PCT International Patent Application No. PCT/US2008/075214, mailed on Oct. 10, 2009.

* cited by examiner

TEMPERATURE AND PRESSURE TRANSDUCER

CROSS REFERENCE TO RELATED APPLICATIONS

This application is a Continuation of U.S. patent application Ser. No. 12/026,795, filed on Feb. 6, 2008, now U.S. Pat. No. 7,863,907 which in turn claims the benefit of priority to U.S. Provisional Application Ser. No. 60/899,629, filed Feb. 6, 2007, the entire contents of each of which are incorporated herein in their entirety by reference.

FIELD

The present invention relates generally to temperature and pressure transducers and more particularly to transducers that shift a frequency of a reflected signal based on a response to temperature or pressure.

BACKGROUND

In operations, piping can extend hundreds or thousands of feet below ground to a well through a harsh downhole environment. Devices have been used for monitoring downhole conditions of a drilled well so that an efficient operation can be maintained. These downhole conditions include temperature and pressure, among others. A pressure sensor implemented in this environment should be configured operate within the potentially difficult environmental conditions. Likewise, a temperature sensor implemented in this environment should have a response that is relatively insensitive to changes in pressure.

SUMMARY

A device in accordance with an embodiment includes a pressure sensor having a first conductor plate that includes a first layer formed on a first substrate. The first layer has a high coefficient of thermal expansion relative to the first substrate. The pressure sensor also has a second conductor plate that includes a second layer formed on a second substrate. The second layer has a high coefficient of thermal expansion relative to the second substrate. A hermetic seal is located at the edges of the first and second conductor plates. The first and second conductor plates are fixed relative to one another, and a gas is retained in an adjustable gap between the first and second conductor plates.

A device in accordance with an embodiment includes a temperature sensor having a first conductor plate that includes a first layer formed on a first substrate. The first layer has a first coefficient of thermal expansion relative to the first substrate. The temperature also includes a second conductor plate having a second layer formed on a second substrate. The second layer has a second coefficient of thermal expansion relative to the second substrate. An adjustable gap is located between the first conductor plate and the second conductor plate, and a vent is formed in at least one of the first conductor plate and the second conductor plate.

A system in accordance with another embodiment includes a an enclosure having a signal generator for generating an electromagnetic energy signal, an oscillating component for generating a ringing signal based on the electromagnetic energy, a component for adjusting a frequency of a ringing signal in response to a change in pressure applied thereto, and a processor for correlating the adjusted frequency to a pressure at the enclosure.

A system in accordance with another embodiment of the invention includes an enclosure having a signal generator for generating an electromagnetic energy of signal, an oscillating component for generating a ringing signal based on the electromagnetic energy, an element for adjusting a frequency of an electromagnetic signal based on a temperature in the enclosure, and a processor for correlating the adjusted frequency to the observed temperature of the enclosure.

A method in accordance with an embodiment of the invention includes using a system having a capacitor with a first plate and a second plate, retaining a gas in a gap between the first and second plates, generating a signal having a predetermined frequency, shifting the frequency of the generated signal based on a warping of at least one of the first plate and the second plate due to a pressure of the gas retained between the first and second plates, and correlating the shift in frequency to a pressure value.

A method in accordance with an embodiment of the invention includes using a system having a capacitor with a first plate having a first coefficient of thermal expansion and a second plate having a second coefficient of thermal expansion and a vent provided in at least one of the first and second plates. The method includes generating a signal having a characteristic frequency, shifting the characteristic frequency of the signal based on a bending of at least one of the first plate and the second plate due to temperature, wherein the bending adjusts a gap between the first plate and the second plate, and correlating the shift in frequency to a temperature value.

A method in accordance with another embodiment includes bonding a first layer having a high expansion coefficient to a second layer having a low expansion coefficient to form a first plate, forming a first dielectric layer on the first layer of the first plate, bonding a third layer having a high expansion coefficient to a fourth layer having a low expansion coefficient to form a second plate, forming a second dielectric layer on the third layer of the second plate, mounting the first plate and the second plate such that the first and second dielectric layers are adjacent, and sealing edges of the mounted plates so that a gas is retained between the first and second plates.

A method in accordance with another embodiment includes bonding a first layer having a high expansion coefficient to a second layer having a low expansion coefficient to form a first plate, forming a first dielectric layer on the first layer of the first plate, bonding a third layer having a high expansion coefficient to a fourth layer having a low expansion coefficient to form a second plate, forming a second dielectric layer on the third layer of the second plate, forming a vent in at least one of the first plate and the second plate, mounting the first plate and the second plate such that the first and second dielectric layers are adjacent and a gap is established between the plates, and bonding edges of the first plate and second plate together.

In accordance with another embodiment of the invention, a machine-readable medium includes machine-executable instructions for performing the methods or operating the systems described herein.

DESCRIPTION OF THE DRAWINGS

Embodiments will be described in greater detail in reference to the drawings, wherein.

DETAILED DESCRIPTION

Figure 1:
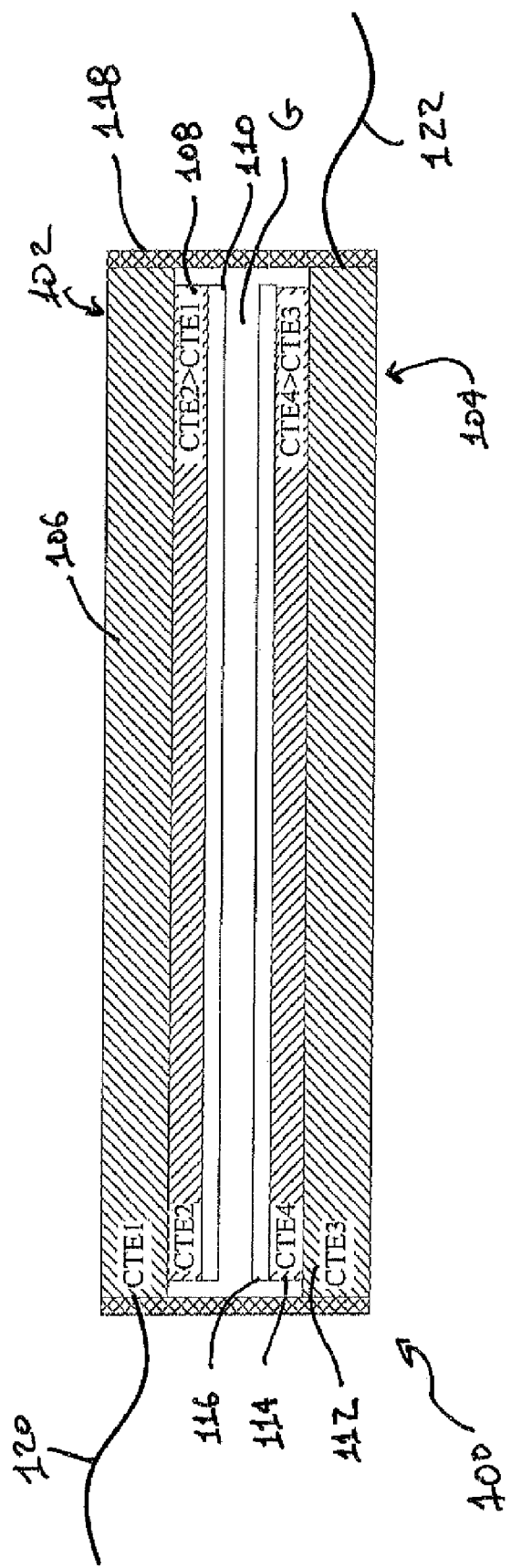
FIG. 1 illustrates a pressure sensor in accordance with an embodiment.

FIG. 1 illustrates a pressure sensor 100 in accordance with an embodiment. The pressure sensor 100 includes a first conductor plate 102 and a second conductor plate 104.

The first conductor plate 102 includes a substrate 106 and a metal layer 108 formed on the substrate 106. The metal layer 108 is formed from a metal that has a coefficient of thermal expansion (CTE2) that is greater than the coefficient of thermal expansion (CTE1) of the substrate 106. A dielectric layer 110 is formed on the metal layer 108.

The second conductor plate 104 includes a substrate 112 and a metal layer 114 formed on the substrate 112. The metal layer 114 is formed from a metal that has a coefficient of thermal expansion (CTE4) that is greater than the coefficient of thermal expansion (CTE3) of the substrate 112. A dielectric layer 116 is formed on the metal layer 114.

The first conductor plate 102 is mounted on the second conductor plate 104 such that the dielectric layer 110 of the first conductor plate 102 is adjacent to the dielectric layer 116 of the second conductor plate 104. A hermetic seal 118 is formed at the edges of the first conductor plate 102 and the second conductor plate 104 such that the first and second conductor plates 102 and 104 are fixed relative to one another. The first conductor plate 102 and the second conductor plate 104 are fixed relative to one another such that a gap (G) between approximately one to twenty thousandths of an inch (0.001"-0.020") is established between the plates. A gas is retained in the gap between the conductor plates 102 and 104. Conductive (e.g., metallic) leads 120 and 122 are connected to the first conductor plate 102 and the second conductor plate 104, respectively. The leads 120 and 122 enable the pressure sensor 100 to connect to external circuitry.

The first metal layer 108 of the first conductor plate 102 has a coefficient of thermal expansion (CTE2) that is greater for the coefficient of thermal expansion (CTE4) of the second metal layer 114 of the second conductor plate 104. Moreover, to respond to pressure changes of the surrounding environment, the gas retained between the conductor plates 102 and 104 can be an inert gas such as nitrogen or argon. It should be readily apparent that any gas may be retained in the gap based on the desired response. The gas can be selected based, for example, on its propensity to provide a reproducible and predictable response to pressure changes of the surrounding environment.

The substrates 106 and 112 of the first conductor plate 102 and the second conductor plate 104, respectively, may be formed of an insulating material having a coefficient of thermal expansion that is substantially equal to zero (0). The insulating material of which the substrates 106 and 112 is formed should be resilient and capable of insulating and providing structural integrity to the pressure sensor 100 for use in harsh environments. A suitable material for forming as substrates 106 and 112 is carbon fiber fabric, however, it should be readily apparent that the choice of materials is not limited to this selection.

The metal layers 108 and 114 of the conductor plates 102 and 104, respectively, are formed from a material having a high coefficient of thermal expansion relative to the material of the respective substrates 106 and 112. Materials known to provide good performance in use as the metal layers 108 and 114 include copper and stainless steel, for example, however, the metal layers 108 and 114 are not limited solely to these materials and may be formed of any metal having a coefficient of thermal expansion that provides the desired response. For low coefficient of thermal expansion materials, metals such as iron-nickel alloys may be suitable. For example 36FeNi (sold under the trade name Invar) or FeNi42 may be suited to low coefficient of thermal expansion applications. Likewise a ceramic material such as Zerodur may be useful in this regard. Where it is necessary to have an insulative property, the metallic alloys may be coated or covered in an insulating material.

During operation, the pressure sensor 100 responds to external pressure by adjusting the size of the gap between the conductive plate 102 and 104 based on the bending (e.g., degree of warpage) of at least one of the respective conductor plates. The gas retained in the gap acts as a spring to move the conductive plates 102 and 104 further apart at lower external pressures and compresses the conductive plates 102 and 104 closer together at higher external pressures. When the metal layers 108 and 114 are formed of a metal such as copper, for example, that has a high coefficient of thermal expansion, the metal layers 108 and 114 also experience bending (e.g., warpage) due to changes in temperature. This bending can be a exhibited by an inward or outward bowing of the respective metal based on temperature. The substrates 106 and 112, when formed from carbon fiber material, for example, have a lower coefficient of thermal expansion and are thus more stable with respect to changes in temperature than the copper of metal layers 108 and 114. In this case, the substrates 106 and 112 can counteract the temperature related warpage of the metal layers 108 and 114, respectively, and reduce the effects of external temperature changes on pressure monitoring. As will be appreciated, the same effect may be achieved by providing both a substrate and a conductor layer having low coefficient of thermal expansion. By selection of relative thicknesses of each layer in addition to proper material selection, the device can be made to be relatively more sensitive to pressure than to temperature.

Figure 2:
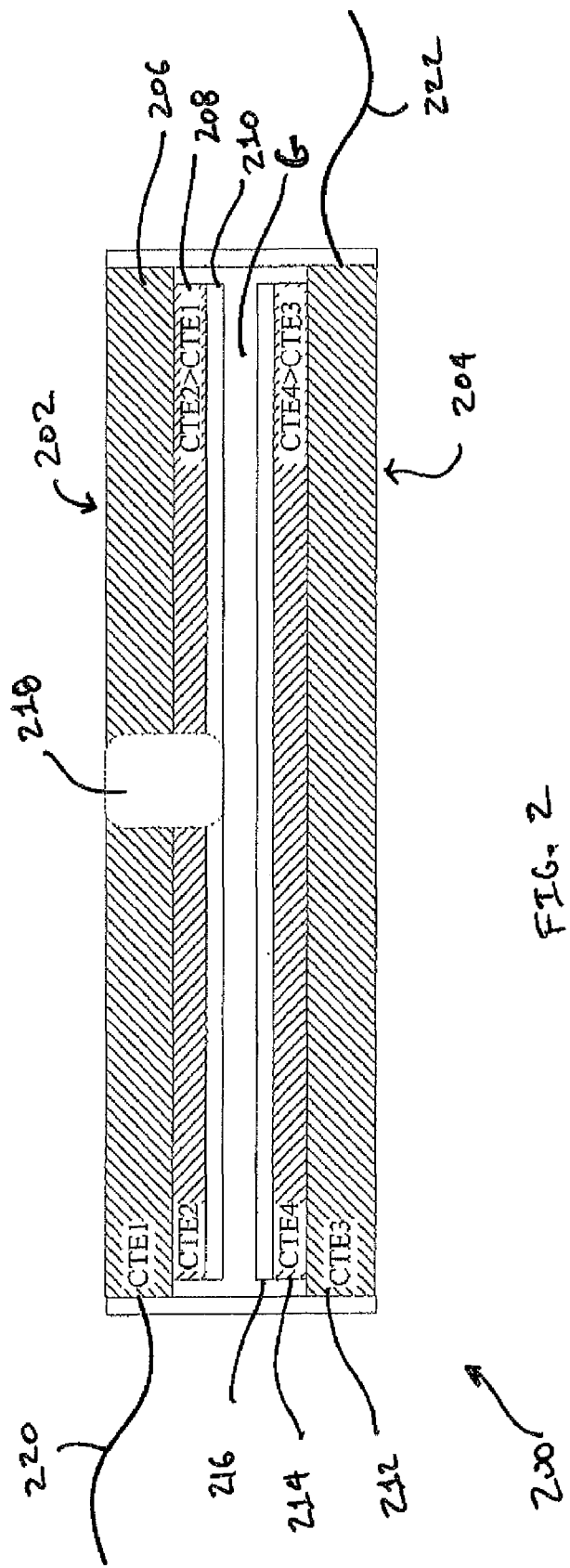
FIG. 2 illustrates a temperature sensor in accordance with an embodiment.

FIG. 2 illustrates a temperature sensor 200 of an embodiment. The temperature sensor 200 includes a first conductor plate 202 and a second conductor plate 204.

The first conductor plate 202 includes a substrate 206 and a metal layer 208 formed on the substrate 206. The metal layer 208 has a substantially higher coefficient of thermal expansion (CTE2) than the coefficient of thermal expansion of the substrate 206 (CTE1). A dielectric layer 210 is formed on the metal layer 208.

The second conductor layer 204 includes a substrate 212 and a metal layer 214 formed on the substrate 212. The metal layer 214 has a substantially higher coefficient of thermal expansion (CTE4) than the coefficient of thermal expansion of the substrate 212 (CTE3). A dielectric layer 216 is formed on the metal layer 214.

A vent 218 is formed through the first conductor plate 202 such that the vent 218 extends from an outer surface of the substrate 206, through the metal layer 208, to an outer surface of the dielectric layer 210. The vent 218 provides an escape path for any gas that is retained between the conductor plates 202 and 204. By providing an escape path for the gas, the vent 218 ensures that external pressure has relatively little influence on the temperature response of the sensor 200.

The first conductor plate 202 and the second conductor plate 204 are mounted such that the dielectric layers 210 and 216 are adjacent. Furthermore, the conductor plates 202 and 204 are mounted such that a gap (G) between one and twenty thousandths of an inch (0.001" to 0.020" or lesser or greater as desired) is established therebetween. Metal leads 220 and 222 are attached to the first conductor plate 202 and the second conductor plate 204, respectively. These metal leads enable the temperature sensor 200 to be connected to external circuitry.

The substrates 206 and 212, the metal layers 208 and 214, and the dielectric layers 210 and 216 may be formed from the same materials as described above with respect to the corresponding components of the pressure sensor 100.

During operation, as the temperature of the surrounding environment increases, the metal layers 208 and 214 bend (e.g., warp) inwardly to reduce the size of the gap (G). The degree of warpage of metal layers 208 and 214 can be related to the coefficient of thermal expansion associated with each respective layer. Additionally, the coefficient of thermal expansion and the thickness of the substrates 206 and 212 can also determine the degree of warpage of the metal layers 208 and 214.

Figure 3:
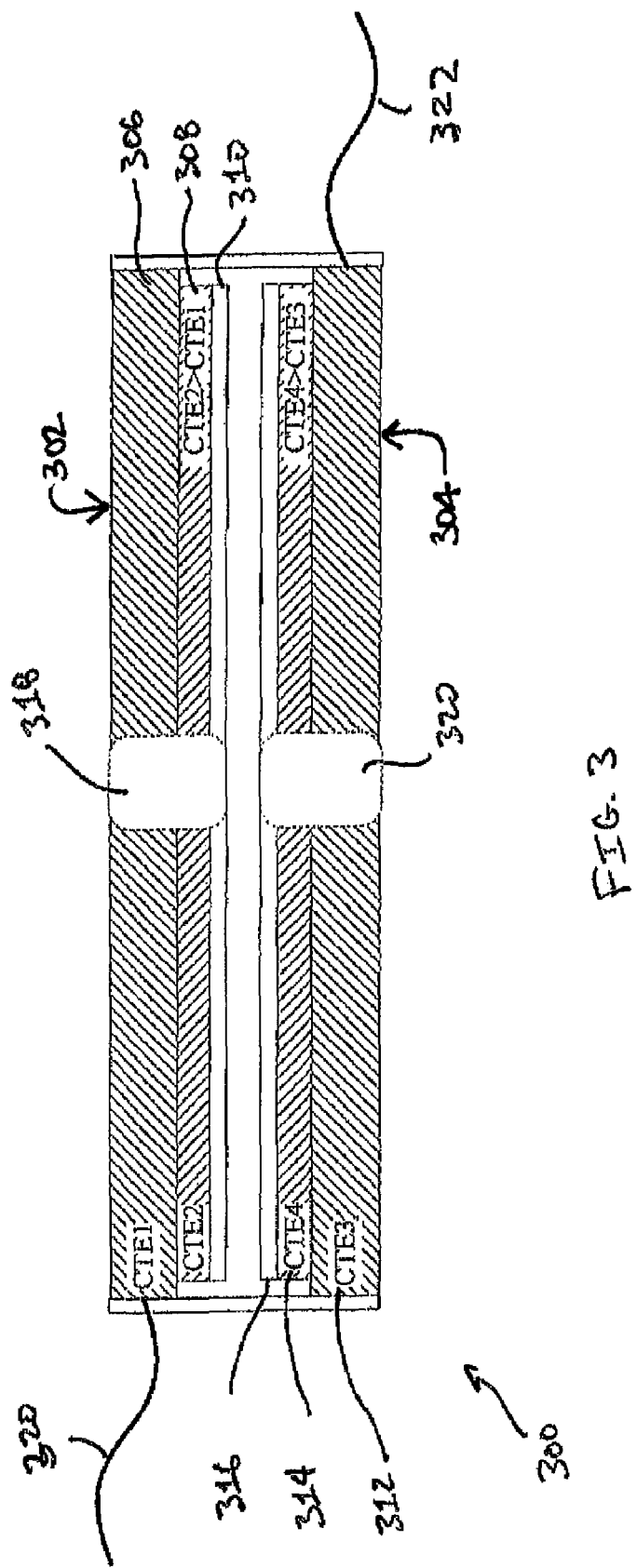
FIG. 3 illustrates a second temperature sensor in accordance with an embodiment.

FIG. 3 illustrates a temperature sensor 300 of an embodiment. Temperature sensor 300 includes a conductor plate 302 having a substrate 306, a metal layer 310, and a dielectric layer 314. The temperature sensor 300 also includes a conductor plate 304 having a substrate 308, a metal layer 312, and a dielectric layer 316. The conductor plates 302 and 304 are implemented through the same materials and employ the same characteristics as described above with respect to the temperature sensor 200 of FIG. 2. In addition to these components, the temperature sensor 300 also includes a vent 318 in the conductor plate 302 and a vent 320 in the conductor plate 304. The vent 318 extends from an outer surface of substrate 306 to an outer surface of dielectric layer 314. The vent 320 extends from an outer surface of substrate 308 to an outer surface of the dielectric layer 316.

During operation, the temperature sensor 300 responds to external temperatures in the manner as described above with respect to temperature sensor 200 of FIG. 2. The use of the additional vent 320 can further reduce or eliminate effects of external pressure by enabling an additional path of escape for any gas retained between the conductor plates 302 and 304.

Figure 4A:
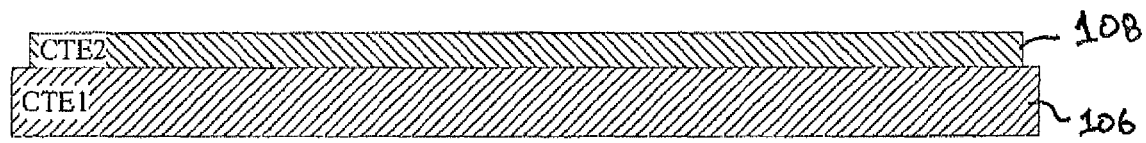
FIGS. 4A-4E illustrates a method of manufacturing a pressure sensor in accordance with an embodiment.
Figure 4B:
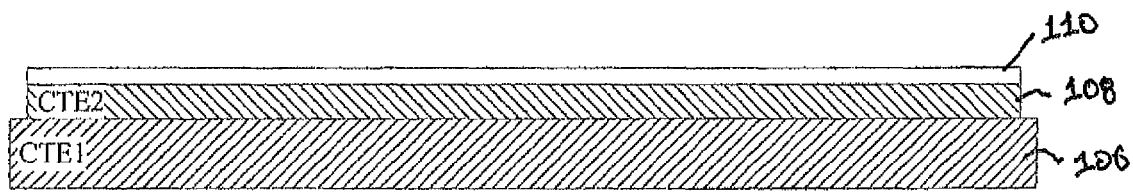
Figure 4C:
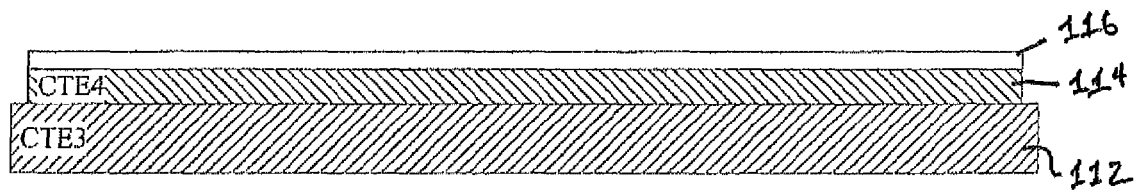

FIGS. 4A through 4E illustrate a process of manufacturing a pressure sensor of an embodiment. In FIG. 4A, the metal layer 108 is formed on the substrate 106. The metal layer 108 may be bonded to the substrate 106 through any known processes, including lamination through an epoxy resin and explosive bonding, for example. In FIG. 4B, the dielectric layer 110 is formed on the metal layer 108. Both conductive plates of the pressure sensor are formed in the previously described manner. FIG. 4C illustrates the conductive plate 104 having the metal layer 114 and dielectric layer 116 formed sequentially on the substrate 112. Those of ordinary skill in the art will appreciate that conductive plates 102 and 104 may be formed through the same or a similar process.

Figure 4D:
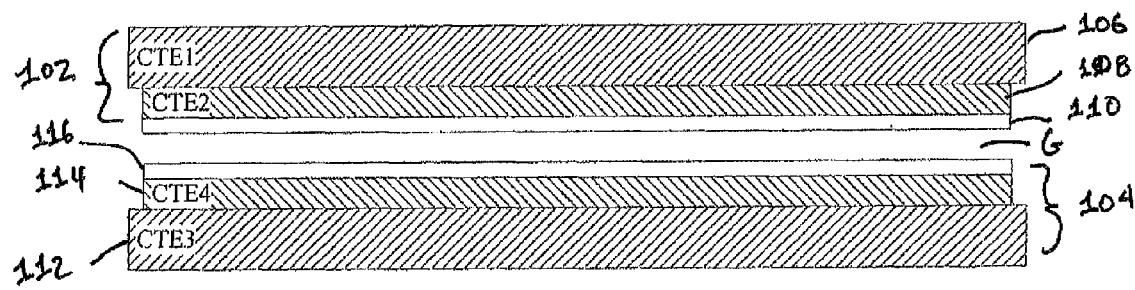
Figure 4E:
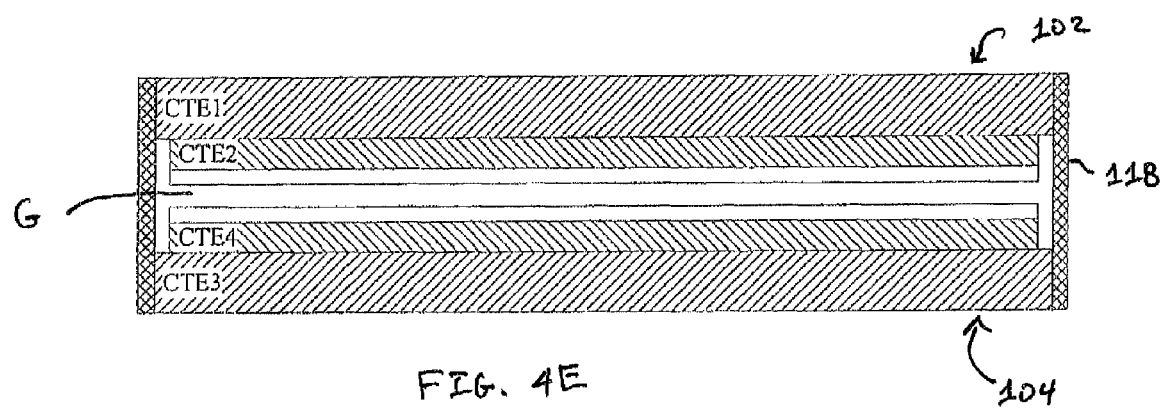

In FIG. 4D, the first conductive plate 102 is mounted on the second conductive plate 104 such that a gap (G) between approximately one and twenty thousandths of an inch (0.001" to 0.020", or less or greater as desired) is established between the dielectric layers of each plate. In FIG. 4E, the two plates are hermetically sealed together at their edges to create a pressure vessel. At the time the two plates are hermetically sealed, air or a gas can be deliberately trapped in the gap (G) between the plates. Alternatively, the air or gas can be injected into the cavity between the plates.

Figure 5A:
FIGS. 5A-5E illustrates a method of manufacturing a temperature sensor in accordance with an embodiment.
Figure 5B:
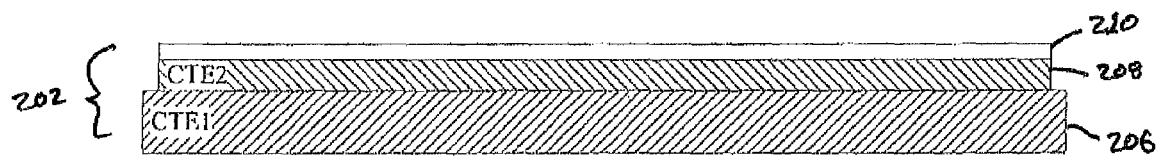

FIGS. 5A through 5E illustrate a process of manufacturing a temperature sensor of an embodiment. In FIG. 5A, a metal layer 208 is bonded to the substrate 206. The metal layer 208 may be bonded to the substrate 206 through processes including but not limited to, for example, lamination using an epoxy resin, and an explosive bonding process. In FIG. 5B, a dielectric layer 210 is applied and formed on the metal layer 208.

Figure 5C:
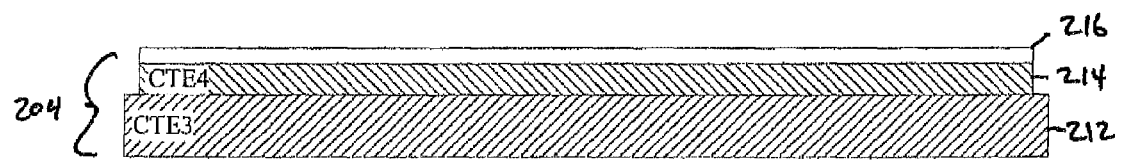

In FIG. 5C, a second conductor plate 204 may be formed in a manner similar to that previously discussed with respect to the first conductor plate 202. For this reason, the process of forming the second conductor plate 204 will not be discussed in greater detail.

Figure 5D:
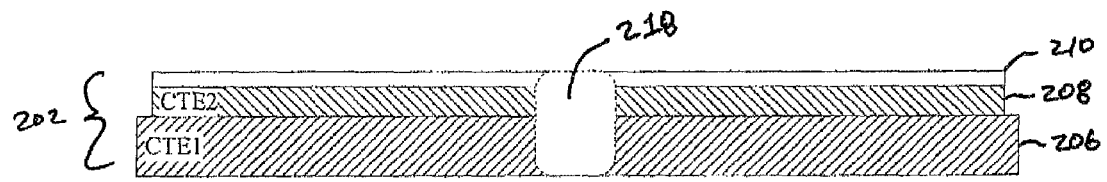

In FIG. 5D, a vent 218 is formed in the first conductor plate 202. The vent 218 is formed by drilling a small hole from the outer surface of the substrate 206 through the metal layer 208, to an outer surface of the dielectric layer 210. It should be readily apparent that this same process may be used to form a vent 218 in the second conductor plate 204.

Figure 5E:
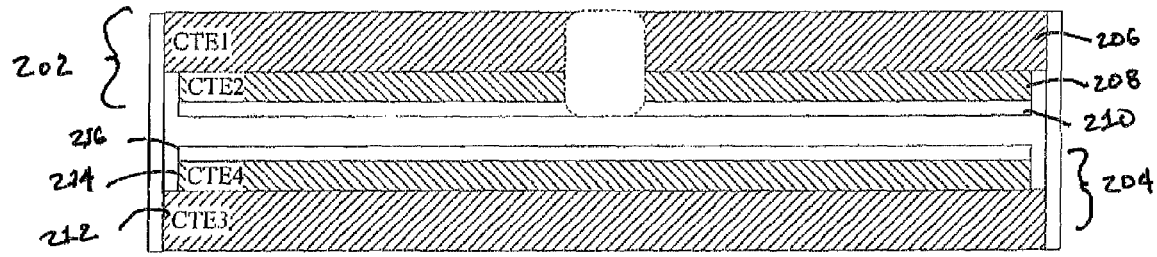

In FIG. 5E, the first conductor plate is mounted onto the second conductor plate such that a gap (G) between approximately one and twenty thousandths of an inch (0.001" to 0.020", or lesser or greater as desired) is established between the two plates. The edges of the two plates are fixedly attached to one another but not sealed so that any influence of pressure is canceled.

The materials used to construct the pressure and temperature sensors should be properly balanced to achieve a desired response to changes in the pressure and temperature of the environment. For example, the thickness of the substrate determines the effectiveness of the substrate in canceling the warping effect of an associated metal layer. Layers may be formed of varying thicknesses and/or have a multilayered structure. Additionally, the substrates of the pressure or temperature sensor may be constructed such that one or both of the conductive plates warp in response to the external temperature or pressure. In an embodiment, the warping or active conductive plate is formed on a substrate having a thickness that enables the plate to effectively warp or bow based on the external pressure or temperature to achieve the desired response. For example, the substrate of the active plate may be formed from a single 0.011" thick carbon fiber fabric. The non-warping or inactive plate is multilayered or otherwise formed at a thickness that restricts the ability of the inactive plate to bow. For example, the substrate of the non-active plate may be formed from a single or multi-layer carbon fiber fabric having a total thickness of 0.033".

Figure 6:
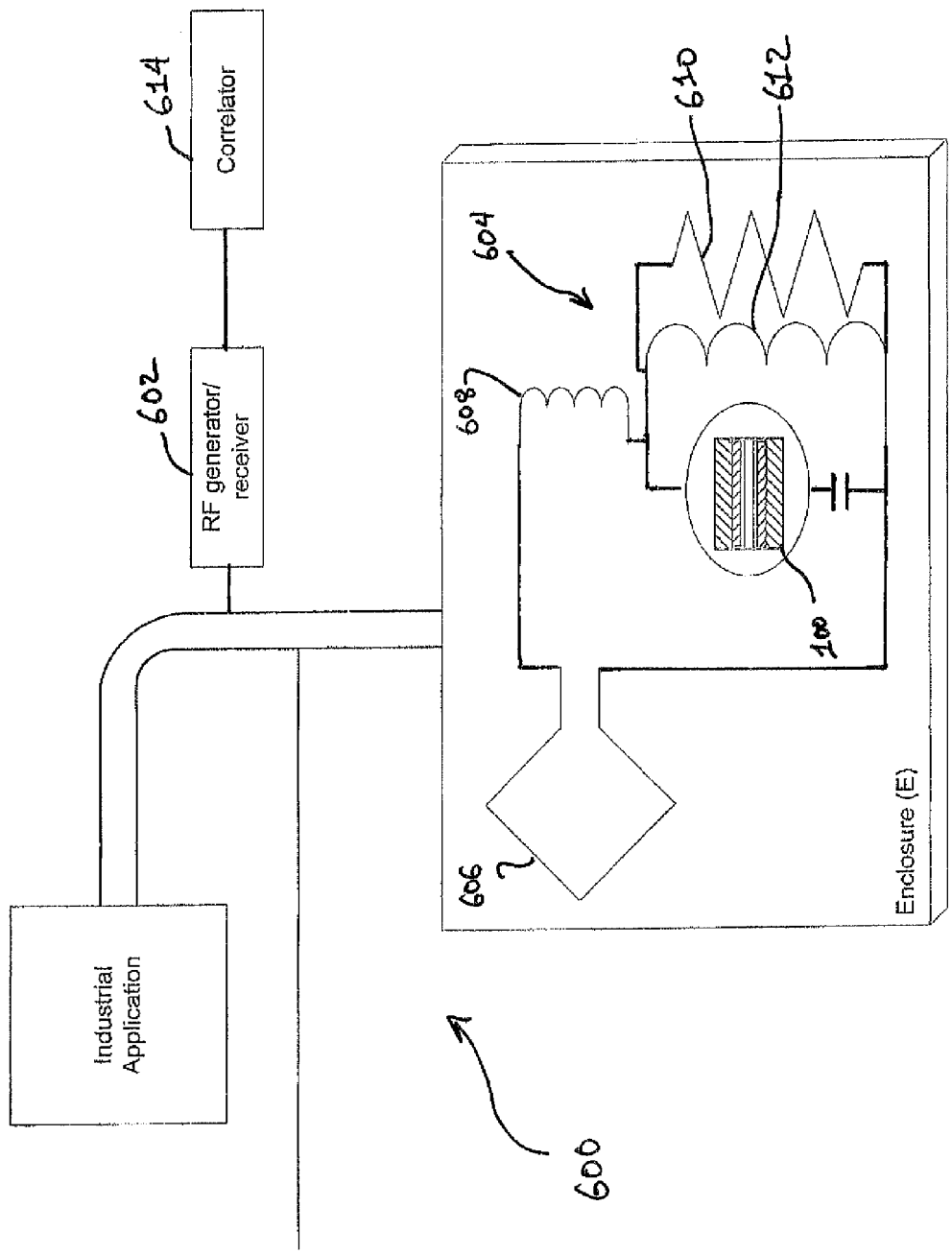
FIG. 6 illustrates an overview of a system for measuring pressure in an enclosure in accordance with an embodiment.

FIG. 6 illustrates an embodiment of a system 600 for measuring pressure in an enclosure (E).

The enclosure (E) may be implemented in numerous shapes and sizes and may be a partial or full enclosure. The enclosure (E), as illustrated, is a representation of a full enclosure that is a high temperature and/or high pressure vessel. By way of example, the temperature within the enclosure may reach up to 600° F.

The high temperatures and pressures realized in the enclosure (E) may be generated by any of numerous industrial applications such as drilling, manufacturing, or construction operations, for example. Those of ordinary skill in the art will appreciate that high temperatures and pressures of the enclosure (E) may also be generated through the innate environmental conditions experienced by the enclosure (E) itself.

The system 600 includes a device, such as a signal generator 602, for generating an electromagnetic signal or an electromagnetic pulse (EMP). The frequency of the signal can be in a range that includes, but is not limited to, RF frequencies such as 3 Hz-30 GHz, or lesser or greater as desired. The signal is communicated to the enclosure (E) through a suitable medium such as cabling, conductive piping, or over-air, for example.

The system 600 also includes a device, such as the capacitive sensor 100, for adjusting the frequency of the signal based on the pressure of the enclosure. The capacitive sensor 100 can be included in a resonant circuit 604.

The resonant circuit 604 includes means such as an antenna 606 for receiving the signal. The resonant circuit 604 also includes means, such as an inductor 608, for connecting the resonant circuit 604 to the antenna 606. The resonant circuit 604 also includes a circuit resistance 610 and circuit inductance 612 which represent the impedance of circuit casing. The resonant circuit 604 receives the signal through the antenna 606, and rings at its natural frequency. The capacitive sensor 100 senses the pressure of the enclosure, and modulates the frequency induced in the resonant circuit 604. The capacitive sensor 100 modulates the frequency by bending (e.g., warping) at least one of the first plate and the second plate relative to the pressure exerted on the gas that is retained in the gap (G) between the plates, by the enclosure (E). The modulated frequency can be processed to provide a measure of the pressure of the enclosure. That is, the vibration frequency induced by the electromagnetic energy is modulated by the sensed pressure of the enclosure, and this modulation of the frequency can be processed to provide a measure of the characteristic.

The system 600 also includes a device, such as a correlator 614, for correlating the modulated frequency to the observed pressure of the enclosure. Those skilled in the art will appreciate that the correlator 614 may be a processor or computer device. The correlator 614 can be programmed to process the modulated vibration frequency to provide a measurement of the sensed characteristic. The measurement can, for example, be displayed to a user via a graphical user interface (GUI). The correlator 614 can perform any desired processing of the detected signal including, but not limited to, a statistical (e.g., Fourier) analysis of the modulated vibration frequency. Commercial products are readily available and known to those skilled in the art for performing suitable frequency analysis. For example, a fast Fourier transform that can be implemented by, for example, MATHCAD available from Mathsoft Engineering & Education, Inc., or other suitable product to deconvolve the modulated ring received from the resonant network device. The processor can be used in conjunction with a look-up table having a correlation table of modulation frequency-to sensed characteristics (e.g., temperature, pressure, and so forth) conversions.

Figure 7:
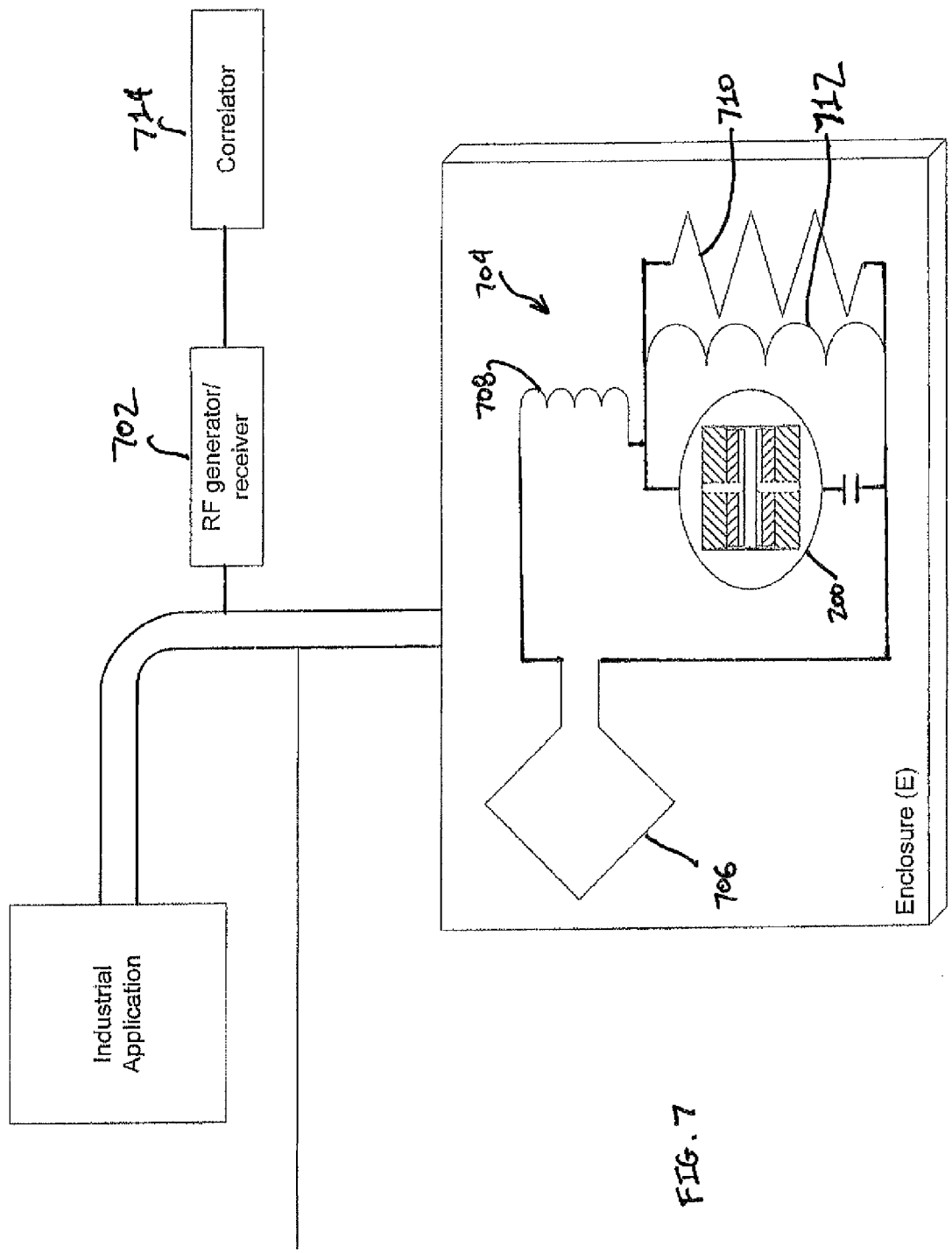
FIG. 7 is an overview of a telemetry system for measuring temperatures in an enclosure in accordance with an embodiment.

FIG. 7 illustrates an embodiment of a system 700 for measuring temperature in an enclosure (E).

The system 700 includes a signal generator 702, a capacitive sensor 200 and, a correlator 714. It should be readily apparent that the signal generator 702, and the correlator 714 are similar to the corresponding elements, as illustrated in the embodiment of FIG. 6.

The capacitive sensor 200 adjusts the frequency of the RF signal resonant circuit based on the temperature of the enclosure. The capacitive sensor 200 can be included in a resonant circuit 704. It will be appreciated that the resonant circuit 704 may be similar to the corresponding element as illustrated in the embodiment of FIG. 6 and likewise includes an antenna 706, inductor 708, circuit resistance 710, circuit inductance 712. The capacitive sensor 200 adjusts the frequency of the resonant circuit 704 by bending (e.g., warping) at least one of the first plate and the second plate relative to the temperature of the enclosure (E).

Figure 8:
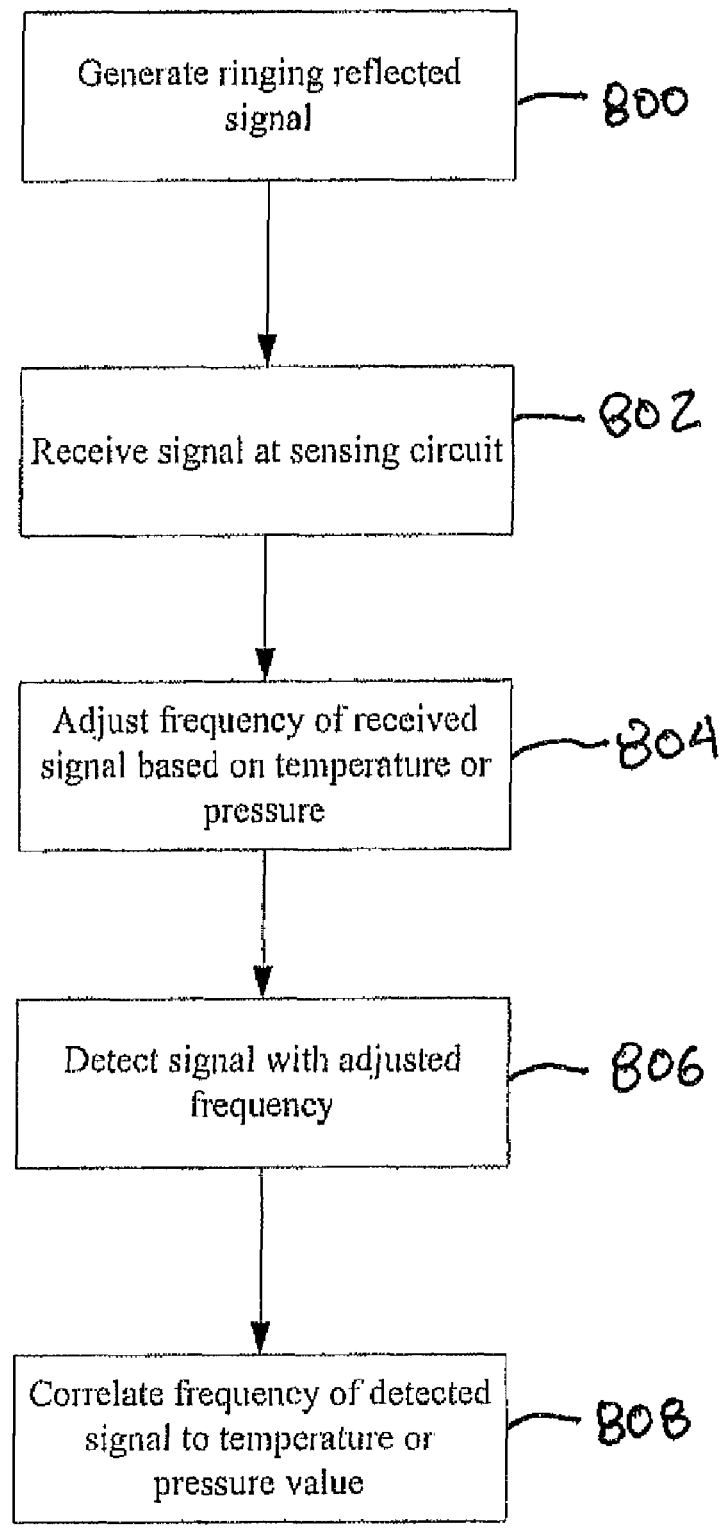
FIG. 8 is a flowchart of a method of measuring temperature or pressure in accordance with an embodiment.

FIG. 8 is a flowchart that illustrates an embodiment of a method of measuring temperature on pressure in an enclosure. To measure pressure, the method is implemented using the system 600 having a pressure sensor 100 as discussed above. To measure temperature, the method is implemented using the system 700 having a temperature sensor 200 as discussed above.

As shown in FIG. 8 at 800, a signal generator generates an electromagnetic signal or an electromagnetic pulse (EMP) at a frequency between, for example, 3 Hz and 30 GHz. The resonant circuit 604, 704 receives the signal (802). The capacitive sensor 100, 200 of the resonant circuit 604, 704 adjusts the frequency of the received signal by bending (e.g., warping) at least one of the first plate and the second plate in response to pressure or temperature depending on the application (804). The bending of the plates adjusts the spacing of the gap between the plates, thereby changing the capacitance of the capacitive sensor 100, 200.

The receiver 602, 702 receives the signal (806) and the correlator 608, 708 uses a look-up table to correlate the modulation of the frequency to an observed pressure or temperature value (808).

While the invention has been described with reference to specific embodiments, this description is merely representative of the invention and is not to be construed as limiting the invention. Various modifications and applications may occur to those skilled in the art without departing from the true spirit and scope of the invention as defined by the appended claims.

What is claimed is:

1. A system for sensing a pressure condition in a subterranean environment, comprising:
   a signal generator, configured and arranged to generate an electromagnetic signal;
   a sensor probe, locatable in a region of the subterranean environment, the sensor probe including a resonant circuit portion that includes a capacitive element, the resonant circuit portion being configured and arranged to receive energy from the electromagnetic signal and to generate a ringing signal in response to the electromagnetic signal, wherein the capacitive element of the sensor probe is responsive to the pressure condition in the region of the subterranean environment to modulate the ringing signal in accordance therewith;
   the capacitive element comprising:
   a first conductor plate having a first conductive layer supported by a first substrate, the first substrate comprising a carbon fiber fabric material; and
   a second conductor plate having a second conductive layer supported by a second substrate, the first and second conductor plates together defining an adjustable gap therebetween, the adjustable gap being adjustable responsive to the condition to alter a capacitance of the capacitive element;
   a seal disposed between the first and second conductor plates, the seal constructed and arranged to retain a compressible material in an adjustable gap between the first and second conductor plates and wherein, the adjustable gap is adjustable responsive to the pressure condition to alter the capacitance of the capacitive element and wherein the first and second conductor plates are arranged and comprise materials selected such that a change in the adjustable gap due to a change in temperature is less than a change in the adjustable gap due to a change in pressure;

a receiver, configured and arranged to receive the modulated ringing signal; and a processor, configured and arranged to process the modulated ringing signal to obtain a measurement of the condition.

2. A system in accordance with claim 1, wherein a coefficient of thermal expansion of one or both of the first and second conductive layers is less than about $10 \cdot 10^{-6}$ 1/K.

3. A system, in accordance with claim 2, wherein a coefficient of thermal expansion of one or both of the first and second substrates is less than about $5 \cdot 10^{-6}$ 1/K, and the coefficient of thermal expansion of each substrate is less than the coefficient of thermal expansion of the corresponding conductive layer.

4. A system in accordance with claim 3, wherein one or both of the first and second conductor plates comprises at least one of carbon fiber, 36FeNi or FeNi42.

5. A system in accordance with claim 1, wherein a flexural response to pressure of the first conductive plate is greater than a flexural response to pressure of the second conductive plate.

6. A system in accordance with claim 1, wherein one or both of the first and second conductive layers comprises a plurality of layers, each layer comprising a material having a low coefficient of thermal expansion.

7. A system in accordance with claim 6, wherein each layer comprises a material having a coefficient of thermal expansion less than about $10 \cdot 10^{-6}$ 1/K.

8. A system in accordance with claim 7, wherein each layer comprises a material having a coefficient of thermal expansion less than about $5 \cdot 10^{-6}$ 1/K, and the coefficient of thermal expansion of each substrate is less than the coefficient of thermal expansion of the corresponding conductive layer.

9. A system in accordance with claim 1, wherein the compressible material comprises an inert gas.

10. A method of measuring a pressure condition in a region of a subterranean environment, comprising:

generating an electromagnetic signal;

receiving energy from the electromagnetic signal and generating a ringing signal in response to the electromagnetic signal, using a capacitive element that is responsive to a condition of the pressure condition in the region of the subterranean environment to modulate the ringing signal in accordance therewith;

the capacitive element comprising:

a first conductor plate having a first conductive layer supported by a first substrate the first substrate comprising a carbon fiber fabric material; and a second conductor plate having a second conductive layer supported by a second substrate, the first and second conductor plates together defining an adjustable gap therebetween, the adjustable gap being adjustable responsive to the condition to alter a capacitance of the capacitive element;

a seal disposed between the first and second conductor plates, the seal constructed and arranged to retain a compressible material in an adjustable gap between the first and second conductor plates and wherein, the adjustable gap is adjustable responsive to the pressure condition to alter the capacitance of the capacitive element and wherein the first and second conductor plates are arranged and comprise materials selected such that a change in the adjustable gap due to a change in temperature is less than a change in the adjustable gap due to a change in pressure;

receiving the modulated ringing signal; and correlating the modulation with a measurement of the condition.

\* \* \* \* \*